United States Patent [19]
Ledewitz et al.

[11] 3,730,393
[45] May 1, 1973

[54] FLEXIBLE CYLINDER FOR COLLAPSIBLE SQUEEZE TUBE

[75] Inventors: William Ledewitz, Woodbridge, Conn.; Robert W. Twigg, Rockford, Ill.

[73] Assignee: Polytube Inc., New Haven, Conn.

[22] Filed: Aug. 20, 1970

[21] Appl. No.: 65,415

Related U.S. Application Data

[63] Continuation-in-part of Ser. No. 853,858, Aug. 28, 1969, abandoned.

[52] U.S. Cl. ............... 222/106, 138/138, 222/107
[51] Int. Cl. ............................................. B65d 35/10
[58] Field of Search .................. 222/92, 106, 206, 222/107; 138/138, 143, 144

[56] References Cited
UNITED STATES PATENTS

| | | | |
|---|---|---|---|
| 2,269,661 | 1/1942 | Gurwick | 222/107 |
| 3,295,725 | 1/1967 | Brandt | 222/107 |
| 1,831,751 | 11/1931 | Rado | 138/138 X |
| 221,130 | 10/1879 | Walsh | 138/143 |

*Primary Examiner*—Robert B. Reeves
*Assistant Examiner*—Thomas E. Kocovsky
*Attorney*—Ryder, McAulay & Hefter

[57] ABSTRACT

A flexible cylinder which is adapted to be used as the body of a squeeze tube is disclosed. The cylinder has a gas-pocket free multi-ply wall including spaced metal foil plies. Along each radial section of the cylinder the wall comprises, in sequence, an inner plastic ply, a metal foil ply, a plastic ply, a metal foil ply, and an outer plastic ply.

3 Claims, 35 Drawing Figures

PATENTED MAY 1 1973 3,730,393
SHEET 01 OF 12
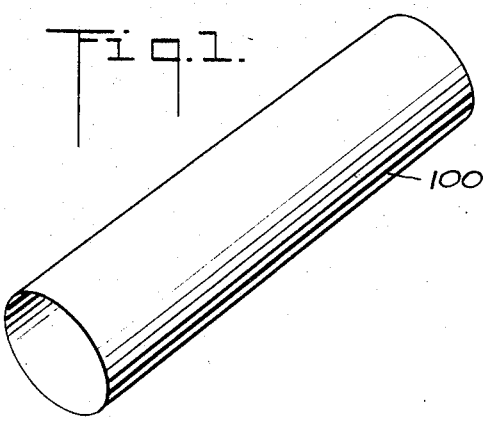
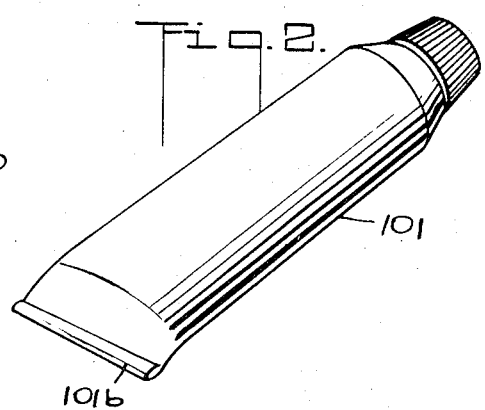
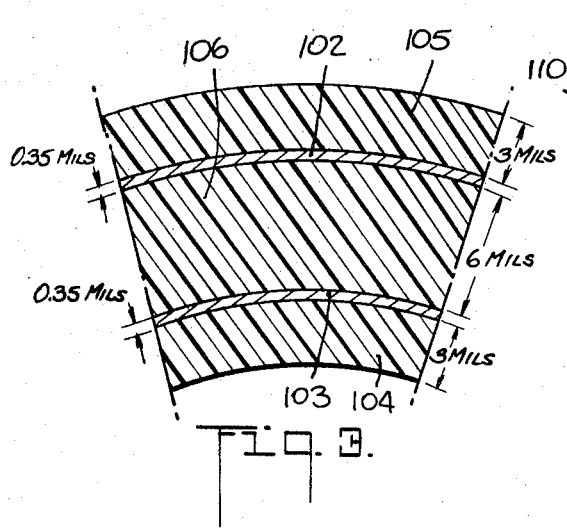
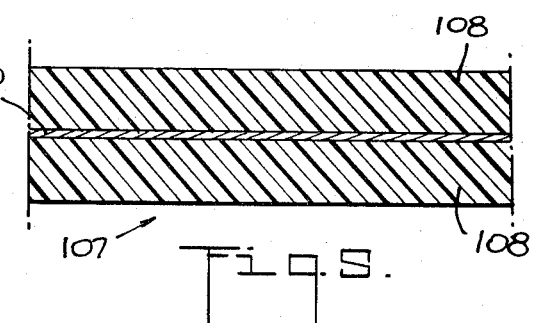
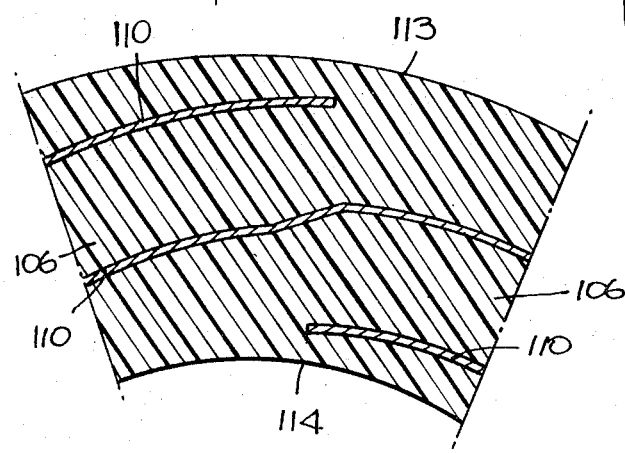
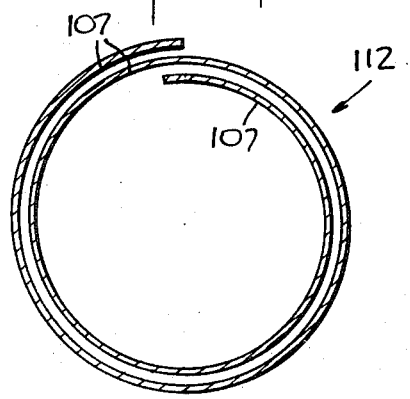
INVENTORS
WILLIAM LEDEWITZ
BY ROBERT W. TWIGG
Kenyon & Kenyon
ATTORNEYS

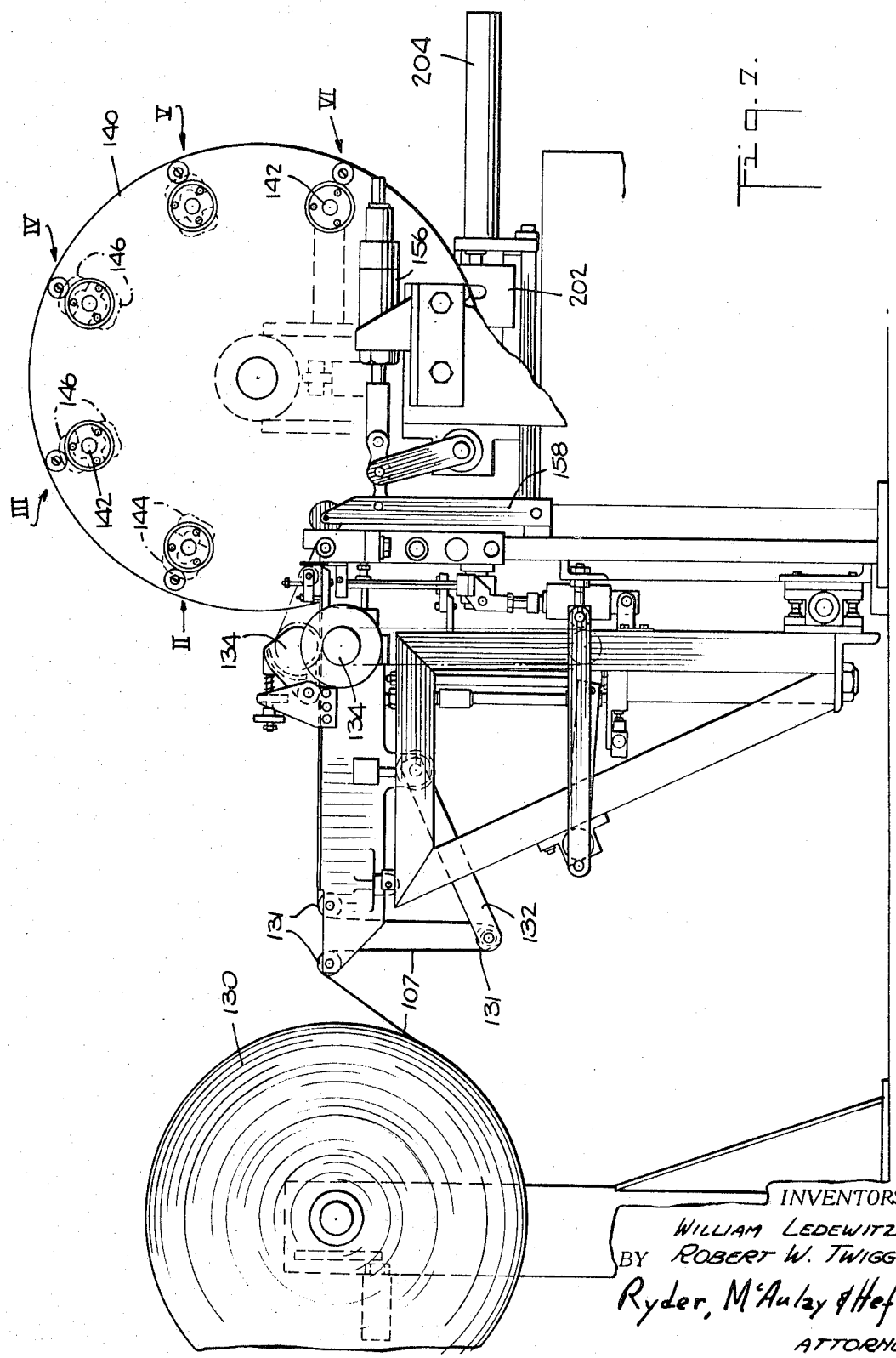

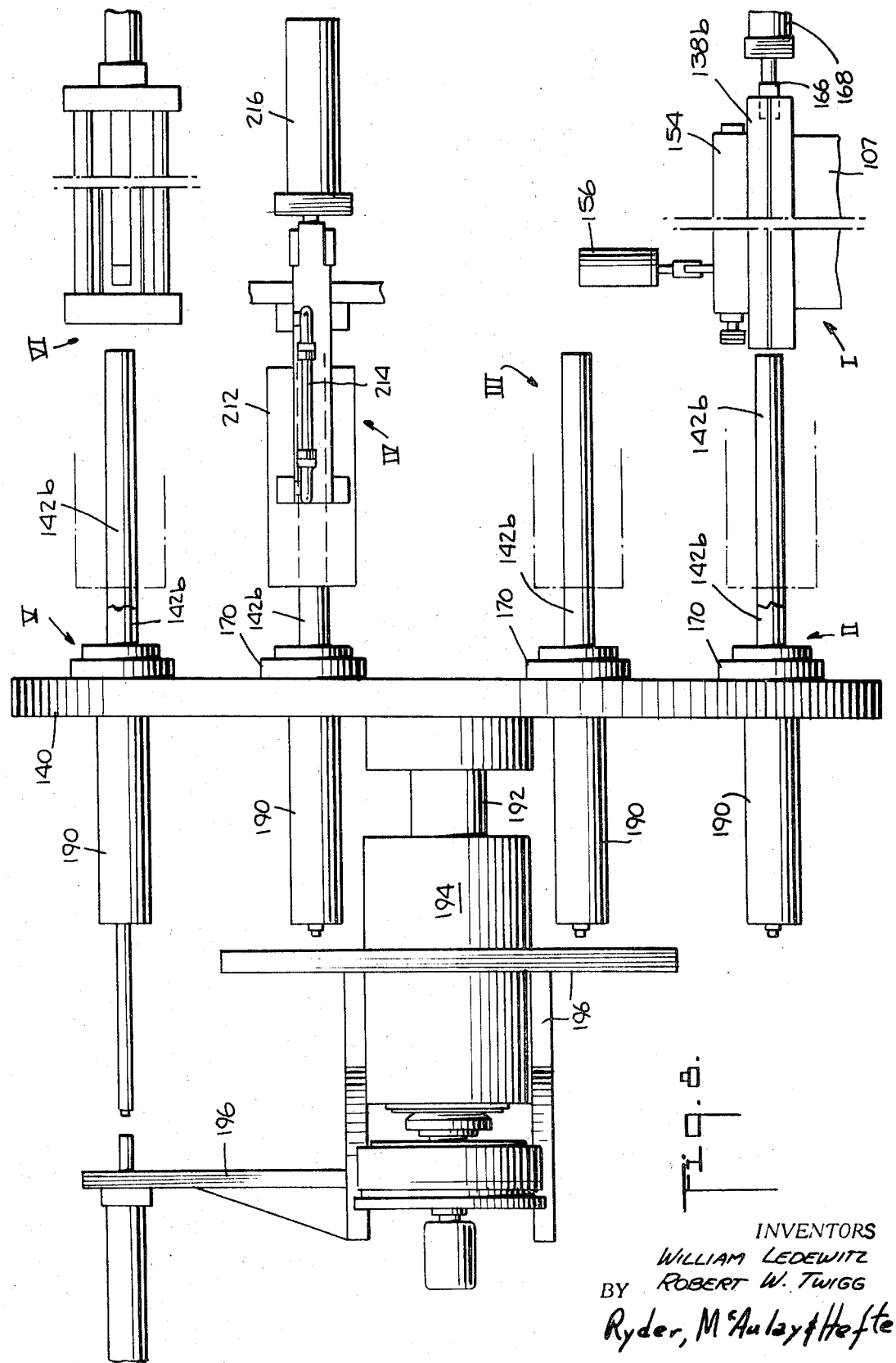

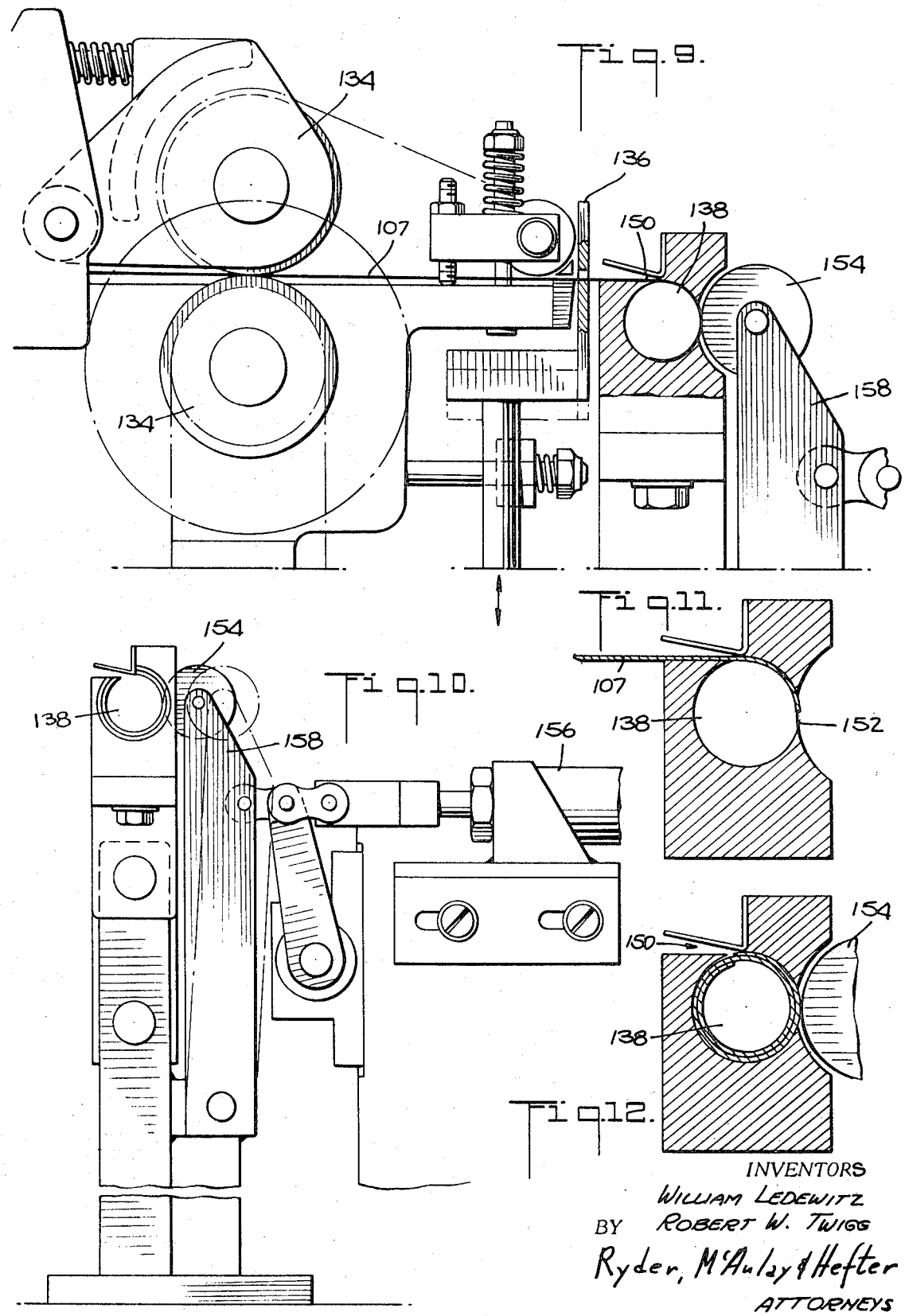

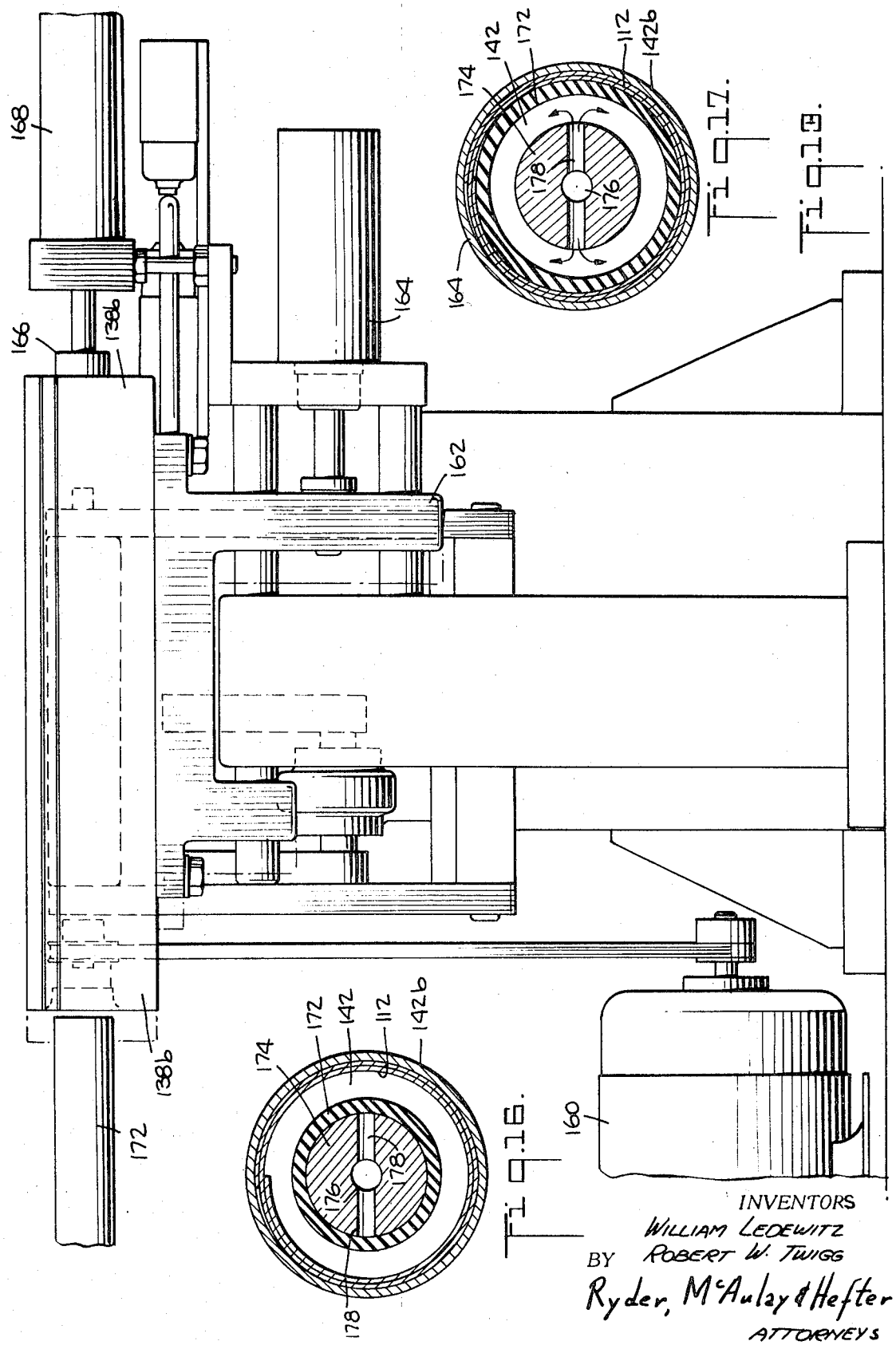

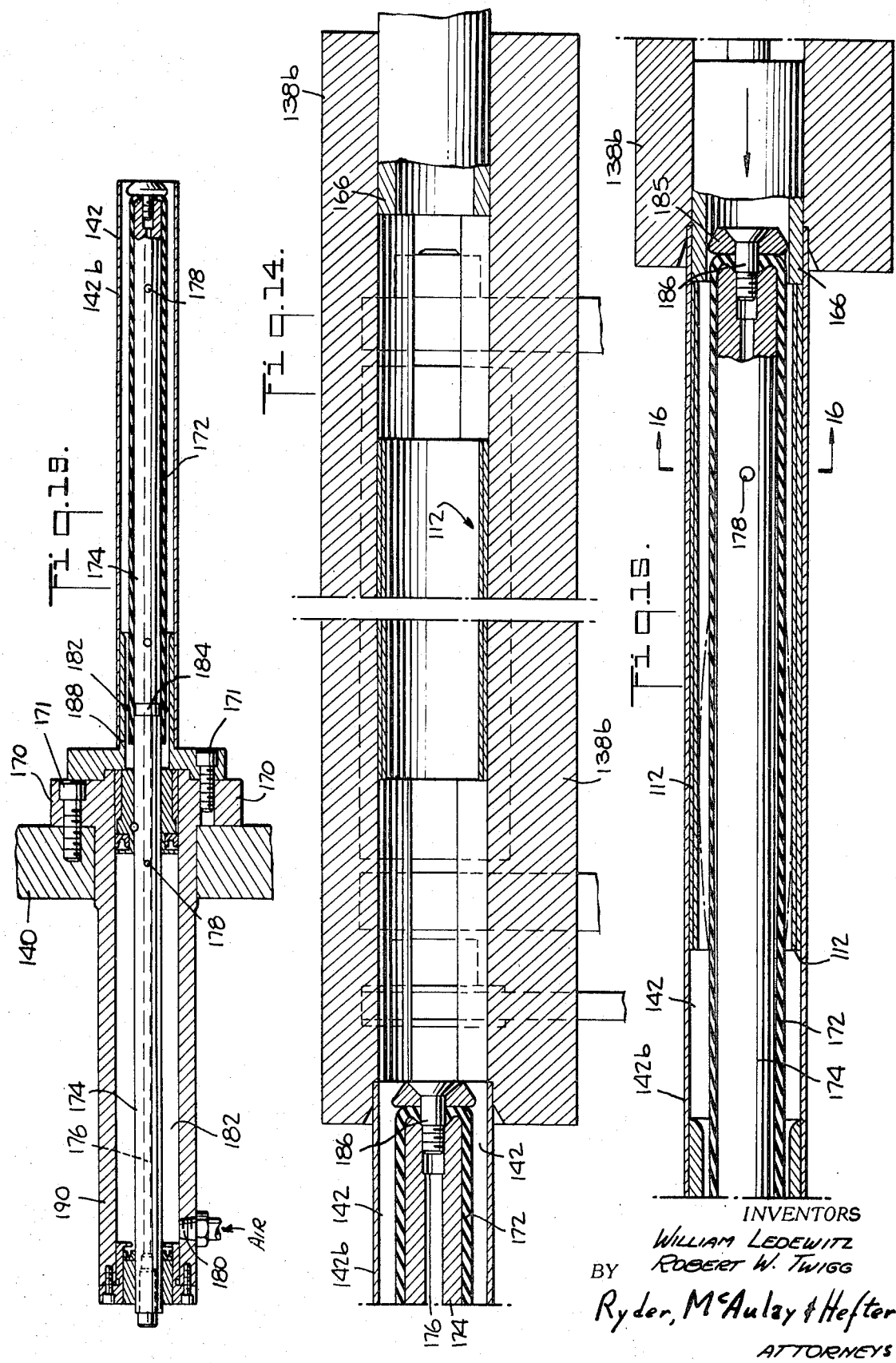

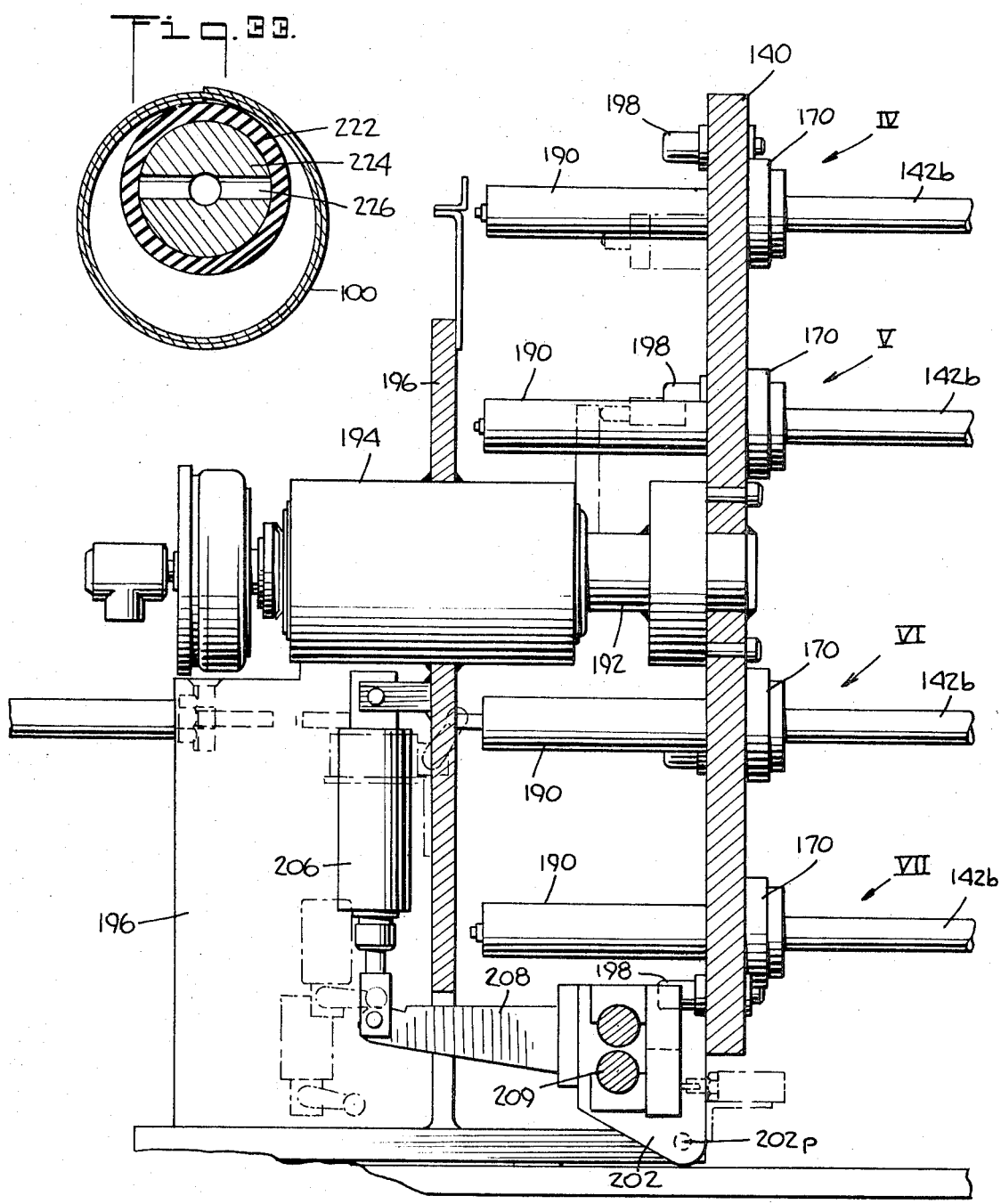

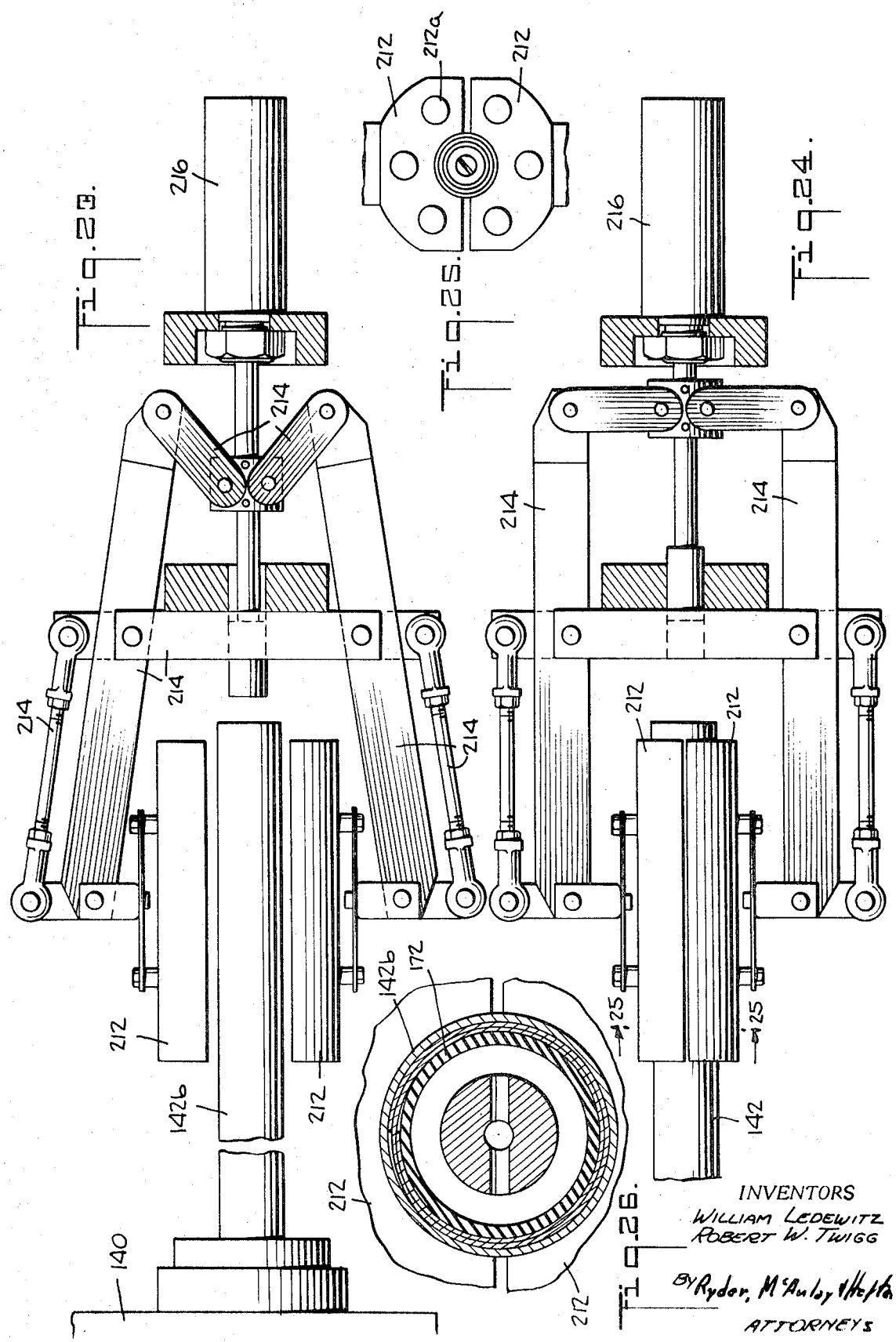

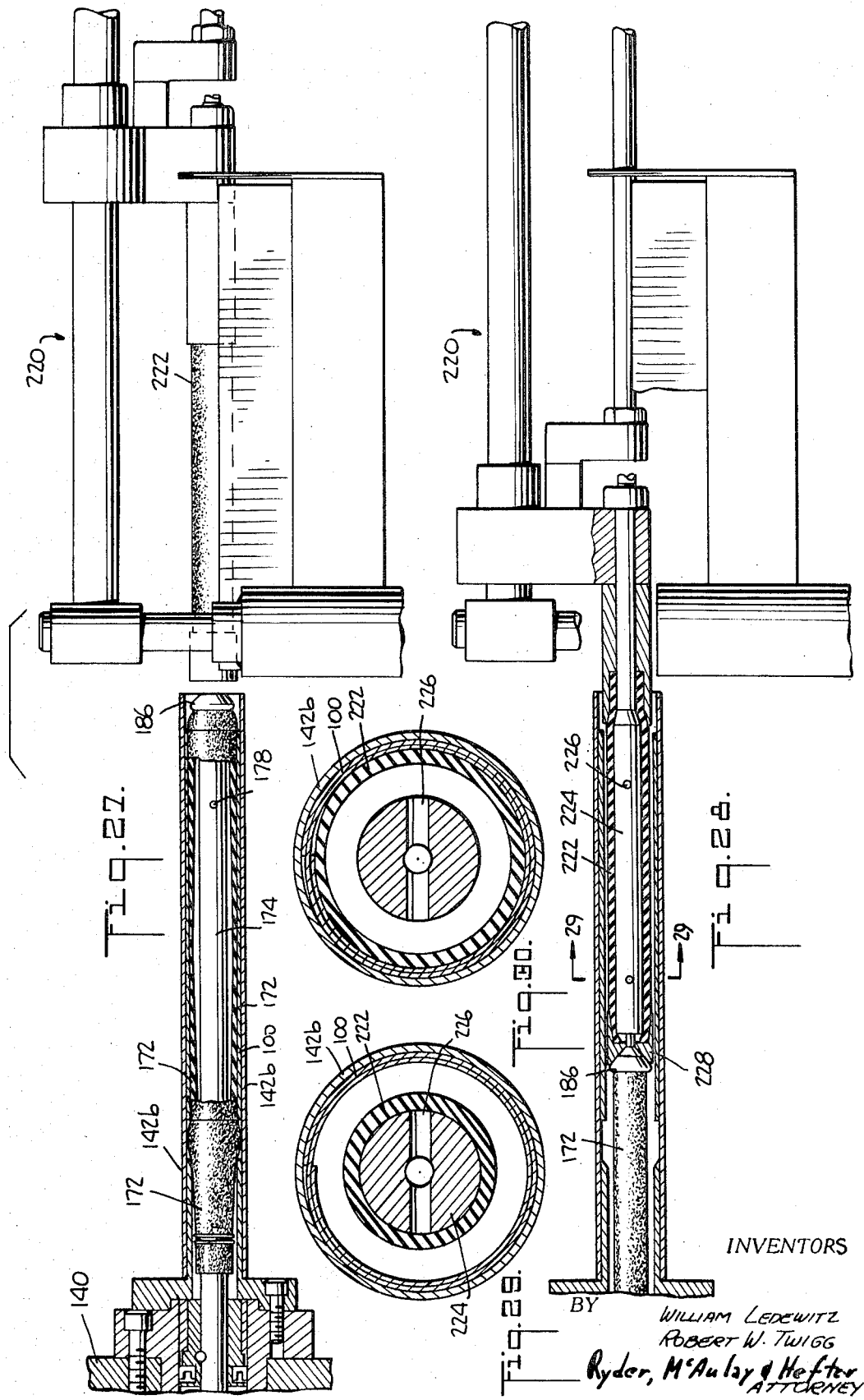

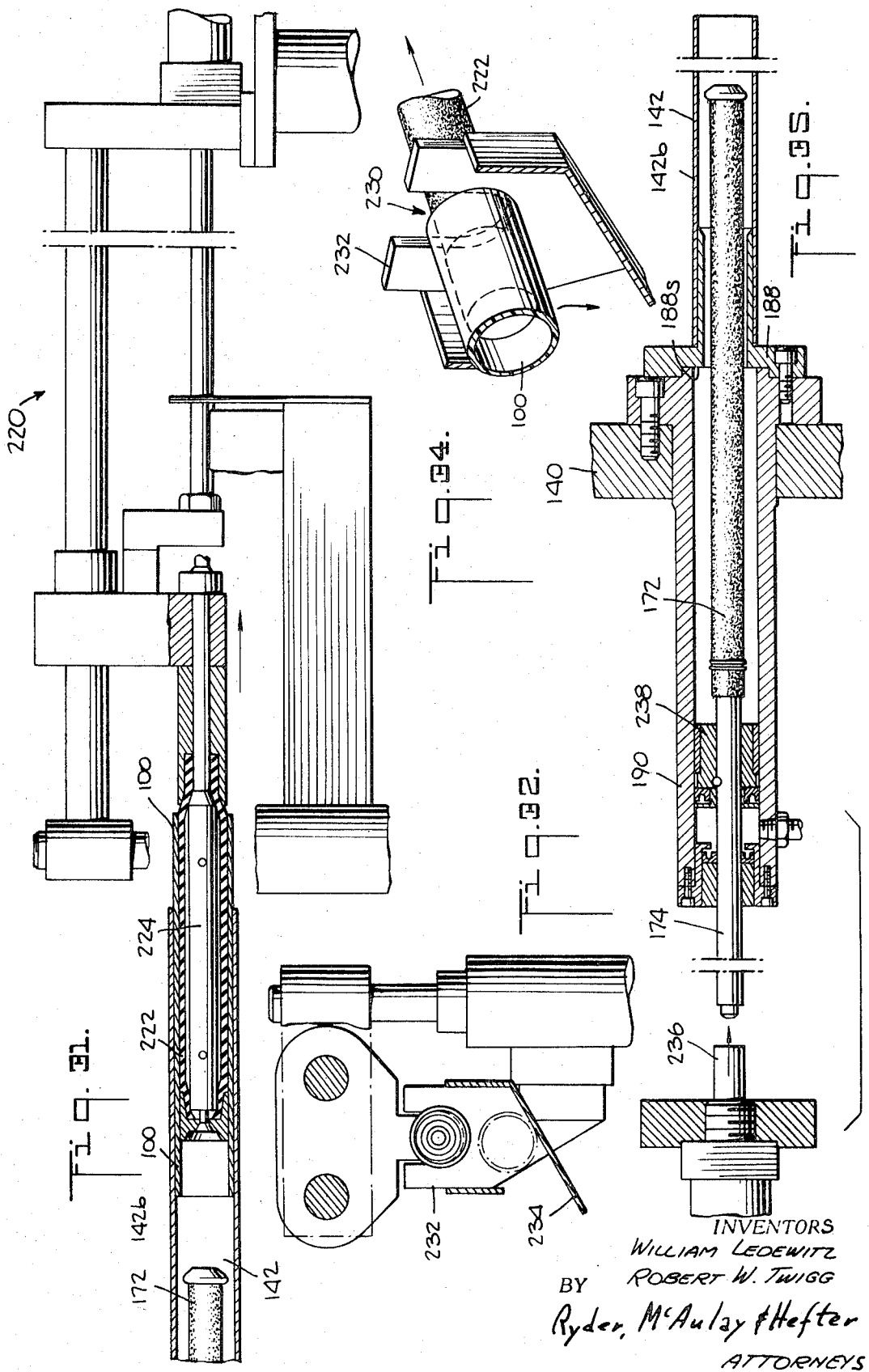

FLEXIBLE CYLINDER FOR COLLAPSIBLE SQUEEZE TUBE

This application is a continuation-in-part of application Ser. No. 853,858 filed on Aug. 28, 1969 by the same inventors now abandoned and entitled FLEXIBLE CYLINDER FOR COLLAPSIBLE SQUEEZE TUBE AND METHOD AND APPARATUS FOR MAKING SAME.

This invention relates to a collapsible squeeze tube container of the type in which toothpaste, shaving cream and a wide variety of lotions are typically packaged and to a machine and method for manufacturing such collapsible squeeze tubes. In particular, this invention relates only to the cylindrical body used in such squeeze tubes, and to the method and apparatus for making such a cylindrical body.

BACKGROUND OF THE INVENTION

The attainment of a satisfactory squeeze tube container is beset with conflicting utilitarian and aesthetic requirements. For example, it is important that the materials contained in the tube not leak through the tube and that the outside environment, particularly oxygen, not leak into the tube. Leakage in either direction is particularly serious where toothpaste is involved since such leakage deteriorates the flavor of the toothpaste. At the same time, it is important that the tube have a compliant, relatively non-resistant feel in order to attain adequate consumer acceptance. These two requirements tend to pose conflicting problems and the attainment of one requirement tends to be at the expense of the other requirement.

To minimize leakage through the wall of the tube, a metal foil such as aluminum is required. But it is important that the metal foil not be attacked by the contents of the container or by the outside environment. Accordingly, the metal foil is generally coated with inner and outer plies of plastic, such as polyethylene. In addition, there are usually adhesive plies between the polyethylene plies and the aluminum ply.

In order to assure that there is no leakage through the body wall, the aluminum foil ply must have sufficient thickness so that there will be a minimum number of pin holes. Adequate aluminum foil thickness to prevent leakage, however, results in undesirable tube wall compliance characteristics. A sufficiently thick aluminum ply to avoid leakage provides too resistant a squeeze characteristic from the point of view of consumer acceptance. In addition, there may be a tendency for a thicker aluminum foil ply to crack more readily than a thinner aluminum ply under conditions of repeated use.

In some squeeze tube designs, a paper layer or ply is incorporated to provide the desired degree of resistance to squeezing but there then frequently occurs a loss of desirable deadfold characteristic. One reason this deadfold feature is important is from an aesthetic point of view in terms of the feel that the customer desires. Another important reason for the deadfold is that if there is spring back of the tube walls after the tube is compressed, there will be suck-back through the opening of the tube. Deadfold avoids suck-back and thus reduces the risk of contamination and deterioration, especially from the oxygen in the air. Where flavorants are involved, this deadfold feature becomes particularly important.

Without specifying all the factors that affect the various squeeze tube characteristics that are of concern, it should be kept in mind that any squeeze tube design presents problems of compromise in obtaining desired deadfold, resistance to leakage and resistance to deformation.

Accordingly, an object of this invention is to produce a cylinder adapted for use in collapsible squeeze tubes which eliminates leakage of the product to be contained in the collapsible tube through the side walls of the cylinder.

Another object of this invention is to produce a cylinder which will resist corrosion and contamination from either the product within the collapsible tube or from the outside environment.

Another object of this invention is to produce a cylinder with desirable deadfold characteristics which reduce spring back of the cylinder walls after they have been compressed.

An overlap of the multi-ply container wall, along the longitudinal axis of the cylinder, is usually required in order to assure that there will be no leakage through the longitudinal joint. It is more difficult to prevent leakage when a butt joint is employed. The result is a double thickness in the cylindrical container wall at the joint area with undesirable consequences. The joint becomes visually obvious as a longitudinal seam on the outer wall of the tube. This detracts from the pleasing quality of the package and particularly from whatever design and decoration are printed thereon. The double thickness along the seam also results in a less satisfactory feel for the tube.

The double thickness of the longitudinal seam raises serious problems in the sealing of the bottom of the tube since, among other things, the heat and pressure required to assure a bottom seal of the tube at the double thickness joint area will tend to be too great for the single thickness of the rest of the wall at this end of the cylinder, causing excessive flow of plastic. Thus, the attempt to minimize leakage by the use of a substantial longitudinal overlap joint results in undesirable aesthetic and functional qualities in the tube.

Accordingly, another object of this invention is to provide a smoother, more uniform and aesthetically pleasing surface on the side walls of the tube, particularly in the area of the longitudinal seam of the tube.

Another object of this invention is to provide a tube cylinder which attains the foregoing objectives with a design that is practical and feasible in terms of economy of manufacture for large volume production without the use of excessively complex machinery.

Another object of this invention is to provide the production machinery necessary for manufacturing a tube cylinder which will attain the foregoing objectives without the use of excessively complex or expensive apparatus.

Another object of this invention is to provide a method for manufacturing a tube cylinder which will attain the foregoing objectives and is also simple and easy to practice.

Further objects and purposes of this invention will appear from the following drawings and description.

SUMMARY OF THE INVENTION

The product of this invention is a flexible plastic and metal foil cylinder adaptable for use in forming collapsible squeeze tubes, such as those used for toothpaste. The cylinder itself constitutes the product of this invention, before a head and screw cap has been fitted on the cylinder and before the opposite end of the cylinder has been sealed. This cylinder consists of a double layer of web material in which the layers have been fused together. The wall of the cylinder consists of two very thin plies of a metal foil, such as aluminum, separated by a middle ply of a plastic, such as polyethylene. There is also an additional ply of plastic on the interior wall of the cylinder and on the exterior wall of the cylinder. Thus, the wall of the cylinder consists of alternate plies of plastic, metal foil, plastic, metal foil and plastic.

The method and machine for manufacturing this flexible cylindrical tube body are also part of the invention. Three-ply web material is rolled into the form of a double-walled cylinder within preforming cavities. Then, the rolled web material in the form of a cylinder is transferred into a thin wall cylindrical forming cavity. Heat and pressure are applied to fuse the two layers of web material together. Heat is applied from a heating jacket clamped around the forming cavity which conducts the heat to the rolled web material contained therein. Pressure is applied by means of an expandable balloon mandrel inside the rolled web material to press the rolled web material against the inner wall of the forming cavity. After the layers of web material have been fused together, the resulting product is cooled by cooling jackets clamped around the forming cavity. After cooling, the flexible cylindrical tube body is removed from the forming cavity on a removal mandrel that has been inserted into the flexible cylinder. The removal mandrel, like the forming mandrel, is an expandable balloon mandrel.

BRIEF DESCRIPTION OF THE DRAWINGS

FIG. 1 is a perspective view of the cylindrical squeeze tube body of this invention;

FIG. 2 illustrates a typical commercial application for the FIG. 1 product, which might be a tube of toothpaste;

FIG. 3 is an enlarged, fragmentary, sectional view through the wall of the FIG. 1 cylinder;

FIG. 4 is an enlarged, fragmentary, cross-sectional view through the wall, at the seam, of the FIG. 1 cylinder;

FIG. 5 is a cross-sectional view of the sheet (or web) of three ply material employed to manufacture the FIG. 1 cylinder;

FIG. 6 shows the material of FIG. 5 convolutely wound as a preformed article, preliminary to being formed into the FIG. 1 cylinder;

FIGS. 7 through 35 illustrate a preferred embodiment of a production machine used to produce the flexible cylinder illustrated in FIGS. 1 through 6;

FIG. 7 is a simplified front elevational view of this production machine;

FIG. 8 is a simplified plan view of the main disc in the FIG. 7 apparatus;

FIG. 9 is an enlarged view of a central portion of FIG. 7 showing in greater detail the mechanism for preforming the FIG. 1 cylinder;

FIG. 10 is an enlarged view of a central portion of FIG. 7 showing the retractable roller mechanism employed in preforming the FIG. 1 cylinder;

FIG. 11 is a fragmentary schematic view showing the FIG. 5 web material partially fed into the preform cavity;

FIG. 12 is a view similar to FIG. 11 showing the completion of the preformed cylinder;

FIG. 13 is an end view, along a plane perpendicular to that of FIGS. 9 through 12, showing the pusher mechanism for transferring the preformed cylinder from the preform cavity to the forming cavity;

FIG. 14 is a transverse sectional view through the preform cavity and a front portion of the forming cavity showing the engagement between the preform cavity and forming cavity just prior to inserting the preformed cylinder into the forming cavity;

FIG. 15 is a transverse sectional view through the forming cavity and a rear portion of the preform cavity showing the preformed cylinder inserted into the forming cavity;

FIG. 16 is a cross-sectional view taken along the plane 16—16 of FIG. 15 showing the preformed cylinder in the forming cavity immediately after insertion therein. FIG. 16 appears on the same sheet as does FIG. 13.

FIG. 17 is a view identical to that of FIG. 16 after the inflatable forming mandrel has been inflated. FIG. 17 appears on the same sheet as does FIG. 13;

FIG. 18 is a front elevational view of the rotatable disc, shown in the upper righthand portion of FIG. 7;

FIG. 19 is a longitudinal sectional view of one of the forming cavities carried on the rotatable disc and is taken along the plane 19—19 of FIG. 18. FIG. 19 appears on the same sheet as do FIGS. 14 and 15;

FIG. 20 is a sectional view through the center of the rotatable disc and is taken along the plane 20—20 of FIG. 18;

FIG. 21 is a partially cutaway view of the bottom portion of the rotatable disc to show the mechanism for indexing the disc;

FIG. 22 is a side view of the lower portion of the disc to show the mechanism for indexing the disc;

FIG. 23 is a longitudinal view of the heating jacket open with one of the forming cavities in position between the two halves of the heating jacket;

FIG. 24 is a view similar to that of FIG. 23 after the heating jackets have closed around the forming cavity;

FIG. 25 is a cross sectional view of the heating jacket and forming cavity taken along the plane 25—25 in FIG. 24;

FIG. 26 is an enlarged view of the center portion of FIG. 25;

FIG. 27 is a longitudinal sectional view through the forming cavity when the forming cavity is moved into alignment with the removal mechanism;

FIG. 28 is a view similar to that of FIG. 27 as the removal mandrel is inserted into the forming cavity;

FIG. 29 is a cross-sectional view along the plane 29—29 of FIG. 28.

FIG. 30 is a cross sectional view similar to that of FIG. 29 after the inflatable removal mandrel has been inflated.

FIG. 31 is a view similar to FIG. 28 as the removal mandrel withdraws to remove the formed flexible cylinder from the forming cavity;

FIGS. 32, 33 and 34 illustrate the mechanism for removing the formed flexible cylinder from the removal mandrel. FIG. 33 is shown on the same sheet as is FIG. 21;

FIG. 35 is a longitudinal view, in partial section, of the forming cavity and mandrel showing the forming mandrel in retracted position;

DESCRIPTION OF THE PREFERRED EMBODIMENT

Figure 18:
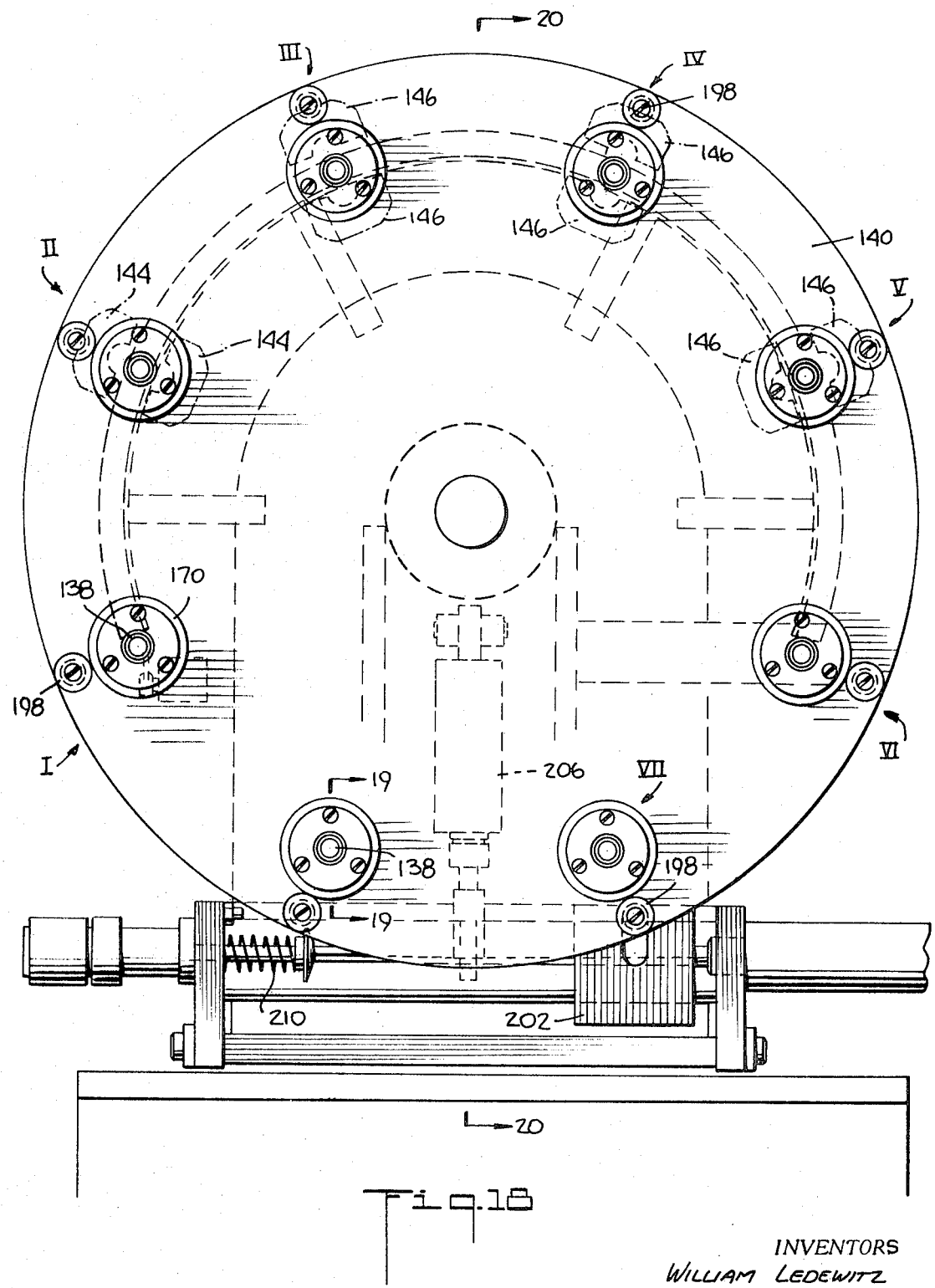

The method and apparatus of this invention are designed to produce, as an end product, a flexible cylinder 100, illustrated in FIGS. 1 through 6. The embodiment of the apparatus of this invention that is described herein has been designed to provide a flexible cylinder, adapted to be used as the body of a squeeze tube, which flexible cylinder can be made anywhere up to twelve inches in length and anywhere from approximately one-half to two and one-half inches in diameter. However, there is nothing inherent in either the flexible cylinder design of this invention or in the method and apparatus for producing this flexible cylinder that limits a cylinder to these ranges of dimensions and such dimensions are stated only to provide some comprehension of the type of device involved.

The Flexible Cylinder

The flexible cylinder 100 of FIG. 1 is intended to be used in collapsible tubes 101 of the type shown in FIG. 2 for the packaging of various products, such as toothpaste, shaving cream, lotions, etc.

As shown in the FIG. 3 sectional view one of the walls of the FIG. 1 cylinder 100, the flexible cylinder of this invention has a five ply wall. There are two spaced apart thin metal foil plies 102, 103. In one embodiment, the thin wall metal foil plies 102, 103 are an aluminum foil 0.00035 inches (0.35 mils) thick. In addition, there are inner and outer plastic plies 104, 105 and an intermediate plastic ply 106; the intermediate ply 106 serving to separate the two metal foil plies 102, 103. In one embodiment, these plastic plies are polyethylene and are bonded to the metal plies 102, 103 by bonding agent plies (not shown). In that embodiment, the inner and outer polyethylene plies 104, 105 were approximately 0.003 inches (3 mils) thick and the intermediate ply 106 was 0.006 inches (6 mils) thick.

It is important that the metal foil plies 102, 103 be well bonded to the plastic plies and particularly well bonded to the intermediate plastic ply 106 so that there are no air spaces at the interface between plies. Metal foil as thin as 0.35 mils is bound to have pin holes through which a product can leak or permeate and/or through which oxygen from the air can permeate in. But by employing two separated metal foil plies, there is almost complete assurance that, along any radial line out of the cylinder, at least one of the two metal foil plies will provide a barrier to permeation. In order to obtain the maximum sealing effect, it is important that air spaces be avoided at the interfaces between plies so that there will be no effective communication through such air spaces to a metal foil area in which the chances of there being at least one pin hole are increased as the area covered by an air space increases.

In the preferred method for fabricating the cylinder 100, a three ply web 107, such as shown in FIG. 5, is used. This three ply web 107 has two outer plastic plies 108 between which is sandwiched a metal foil ply 110.

The web 107 used has a width equal to the length of the cylinder 100 which it is desired to fabricate. A length of the material 107 is cut and convolutely wound to form a two web thickness pre-formed cylinder 112 such as is shown in FIG. 6. By employing pressure and heat, the adjacent plastic plies 108 fuse together to provide a cylinder 100 having the five ply wall arrangement shown in FIG. 3.

However, a longitudinal seam is formed so that along one longitudinal zone of the cylinder 100 the cross-sectional view through the seam area will appear as is shown in FIG. 4. When manufacture of the cylinder 100 of this invention is by the method of convolutely winding of web 107, the middle plastic ply 106 is the result of the fusing together of adjacent web plastic plies 108. By use of a smooth wall heating cylindrical die surrounding the outside of the convolute web arrangement 112 in combination with an inflated balloon mandrel inside of the convoluted web 112 to exert radially outward pressure, it becomes possible to provide the smooth seam shown in FIG. 4. When heat is applied and pressure maintained, the plastic material 108 of the web will flow in a fashion that provides a smooth seam, particularly along the outside surface.

As shown in FIG. 6, the web 107 is rolled so as to form a double web layer around the wall of the cylinder except for a small section where the two ends of the web section overlap to form a triple layer. The amount of overlap shown in FIG. 6 is reduced when pressure is applied subsequently and can be kept to a minimum because there is a continuous web and thus a continuous metal foil ply between the two ends.

In the state in which the preformed cylinder 112 is shown in FIG. 6, there is air between the layers of web material 107. This air is removed during the process of fusing the two layers of web material together by means of a technique whereby radially outward pressure is applied to the inside of the convolutely would web 112. This pressure is first applied to a central annular zone of the preformed cylinder 112 and then is spaced progressively outward in an axial direction toward the two open ends of the preformed cylinder 112. Thus whatever air might otherwise be trapped between the two layers of web material 107 is squeezed out of the preformed cylinder 112 ends. Only then is heat applied to fuse adjacent polyethylene plies.

There are microscopic holes in thin aluminum foil plies. The advantage of using two plies of aluminum is that it greatly reduces leakage because the holes of one aluminum ply are not aligned with holes of the other aluminum ply.

FIG. 4 shows a cross-sectional view of the finished flexible cylinder wall at the longitudinal seam. The areas that overlap have been smoothed both on the outside wall 113 and the inside wall 114 by the flow of plastic during the fusing stage through the use of heat and pressure. The plastic has filled in the crevice on the outer wall 113 and the crevice on the inner wall 114 to produce a smooth longitudinal seam.

Referring to FIG. 4, after the layers have been fused together the double-layer design reduces leakage at the joint enormously since the only way of leaking, without going through the aluminum, is to go around through the central plastic layer 106, a full 360°. Since the overlap formed by the ends of the web is not relied on for sealing against permeation, the tube of this invention can employ a very minimal amount of overlap. This smaller overlap results in a smoother, less bulky, less obvious longitudinal seam.

The longitudinal seam formed by the ends of the web is less noticeable than in a conventional tube because the triple thickness at this seam zone is only 50 percent thicker than the double layer of web around the remainder of the cylinder 100. In a conventional squeeze tube, made of a single layer of web material, the longitudinal seam is 100 percent thicker than the remainder of the tube. This is important when the bottom 101b of the cylinder 100 is later sealed in the fabrication of the collapsible tube 101 shown in FIG. 2.

Referring to FIG. 5, the outer layers of polyethylene 108 instead of being a single layer, may be composed of two or more layers of plastic. For example, to achieve desired results in the printing of advertising material on the outer surface of the tube, it may be desirable to have the polyethylene layer composed of two layers, the outer layer of which has a color which forms a desirable background for the printed material.

The thickness of the metal foil affects a number of characteristics including permeation, resistence to being squeezed, wrinkling as the tube is used, and, in general, the feel which the customer obtains in employing the tube. Accordingly, in a second embodiment, it was preferred to employ an aluminum foil 0.00050 inches (0.50 mils) thick. Furthermore, in order to assure as great a dead fold characteristic as possible, it is preferred to employ aluminum foil that is generally characterized as "dead soft," meaning that the aluminum foil has been tempered or otherwise treated in such a fashion as to have minimum resilience.

A further important advantage of the cylinder design of this invention is an increased bursting strength. The known butt weld cylinder design not only results in a permeation problem at the butt joint but also results in a wall weakness at the butt joint. The convolute design of the cylinder of this invention provides a substantially increased wall strength. As a practical consequence, this means that a squeeze tube employing the cylinder of this invention will be much less subject to rupture when receiving severe and repeated use.

Overall Apparatus

The method and apparatus of this invention are designed to perform the operation of rolling the web of material into the form of a convolute dual web cylinder 112 of the types shown in FIG. 6 and then fusing together the plies to produce the flexible collapsible cylinder 100 of this invention.

FIG. 7 is a simplified front elevational view of the apparatus which performs this function. With a broad understanding of the overall apparatus as shown in FIG. 7 in mind, one can then better understand the individual stages and units that perform the operations of preforming, fusing, cooling and removing the collapsible cylinder product.

As shown in FIG. 7, the three ply web of material 107 is fed from a roll 130, around rollers 131, by way of a tension maintaining dancer arm 132, between a pair of drive rollers 134 and then through a guillotine blade 136 into a preform cavity 138. The width of the web 107 is equal to the length of the cylinder 100 that is to be fabricated. The blade 136 is controlled by a conventional crankshaft mechanism (not shown) to cut the web 107 into units long enough to be rolled into the 720° convolute cylinder 112 shown in FIG. 6.

A rotatable disc 140 is mounted behind the preform cavity 138. In one embodiment, this disc has a diameter of twenty eight inches. The disc 140 carries eight forming cavities which are equally spaced circumferentially around the disc. By means of an intermittent drive, the disc 140 rotates in steps of 45° at a time. The preformed flexible cylinder 112 that is in the preform cavity 138 is transferred to a forming cavity 142 located directly behind the preform cavity 138. The forming cavity containing the preformed flexible cylinder then rotates 45° from this first position (Position I) to a second position II where heating jackets 144 clamp around the preformed cavity to fuse the preformed cylinder 112 into a fused cylinder having the cross-sectional arrangements shown in FIGS. 3 and 4. On the next three 45° increments of rotation, the forming cavity 142 goes through three stages III, IV and V of cooling. During each of these three stages, cooling jackets 146 are clamped around the forming cavity 142 in order to cool the formed collapsible cylinder and cause the formed cylinder to shrink enough to break away from the inside wall of the forming cavity 142. At a sixth stage, VI, a removal mechanism (not shown in FIG. 7) positioned in front of the disc 140 removes the formed cooled cylinder 100 from the forming cavity 142. In the embodiment shown, positions VII and VIII (obscured in FIG. 7) do not perform an operational function.

With reference to FIG. 7, the various units and assemblies that are not mounted on the disc 140 are positioned in front of the disc 140. Specifically, these units and assemblies are: the preform unit and transfer mechanism located at station I of the disc, the heating jacket located at station II of the disc, the three coooling jackets located, respectively, at stations III, IV and V of the disc, and finally the removal apparatus located at station VI of the disc.

There are a large number of limit switches which are actuated by various movements of the disc 140, piston 166, mandrel support tube 174, and other items described and shown to provide timing and sequencing. Such mechanism is obvious to one skilled in the art once this disclosure is known and understood and thus details of the sequencing and timing mechanism are not disclosed herein.

Preforming

As an intermediate product, the convolute dual web cylinder, such as that shown in FIG. 6, if formed. This preforming operation and the mechanism employed can be understood with reference to FIGS. 7 and 9 through 13, with particular reference to FIGS. 9 through 12.

The preform cavity 138 has a tangential opening 150 into which the web 107 is fed by the drive rollers 134. As the web 107 enters the preform cavity 138, the web 107 curves around the wall of the cavity 138 (see FIG. 11).

There is a longitudinal opening 152 (see FIG. 11) in the wall of the preform cavity 138. A rotatable rubber friction roller 154 is mounted adjacent to this opening 152. In retracted position roller 154 is outside of the opening 152 but when the roller 154 is advanced, the roller 154 extends into the opening 152 a sufficient degree to make tangential friction contact with whatever web 107 is being fed into the cavity 138. When the web 107 is initially fed into the cavity 138, the friction roller is in a retracted position until after the web 107 passes the opening 152. Once the web 107 is past the opening 152, a cylinder 156 is actuated at the appropriate point during the feeding step to advance the rocker arm 158 on which the roller 154 is mounted. The friction roller 154 is powered by a motor 160 (see FIG. 13) to rotate in a direction that pulls the web 107 into the cavity 138. The friction roller 154 operation is essential to complete the convolute winding of the web after the blade 136 has been actuated to cut off the appropriate length of material. After the convolute winding has been completed, as shown in FIG. 12, the friction roller 154 is retracted so that the convolute intermediate product 112 can be withdrawn from the preformed cavity 138. Once the preforming operation has been completed, a transfer device located in front of the preform cavity 138 is operated to push the intermediate product 112 out of the preform cavity back into a forming cavity 142.

The Transfer Mechanism

FIGS. 13, 14 and 15 best illustrate this transfer mechanism. The preform cavity block 138b is shown as mounted on a bracket 162, which bracket 162 is connected to a cylinder 164 that causes the bracket 162, thus the preform cavity 138, to be advanced to the left, as seen in FIG. 13, after the preforming operation is completed. The advancement of the preform block 138b to the left (as shown in phantom in FIG. 13) causes the rear end of the preform block 138b to engage the forming cavity cylinder 142b. In this fashion, close alignment between the preform cavity 138 and forming cavity 142 is achieved.

A piston 166 is positioned in the forward portion of the preform cavity 138 with slip-fit relationship to the cavity 138. When the cylinder 168 is actuated the piston 166 advances, contacts the forward edge of the convolute intermediate product 112 and pushes this product 112 out of the rear of the preform cavity 138 into the forming cavity 142. FIG. 14 shows the preform cavity block 138b advanced to engage the cylinder 142b which defines the forming cavity 142 but with the piston 166 not yet advanced. FIG. 15 shows the piston 166 advanced into the forming cavity 142. The piston 166 is an annular piston having an open center so that when the piston 166 advances into the forming cavity 142 it can accommodate the mandrel mechanism that extends down the center of the forming cavity 142. The piston 166 is then retracted as is the preform cavity block 138b so that the forming cavity 142, which is mounted on the disc 140, is free to rotate with the disc 140 as the disc 140 advances 45° to stage II, the fusion stage.

The piston 166 when fully retracted remains within one end of the preform cavity 138. Thus, the piston 166 is automatically always in alignment with the preform cavity 138 and no special alignment procedures are necessary.

The Forming Cavity and Mandrel

As may best be seen in FIGS. 15, 16, 17 and 19, with particular reference to FIG. 19, the forming cavity 142 is defined by a thin wall cylinder 142b which is mounted through a flange 170 and bolts 171 onto the rotatable disc 140. As indicated above, there are eight of these cavities 142 mounted at equally spaced intervals near the periphery of the disc 140. An inflatable rubber tube-like mandrel 172 extends along the length of the forming cavity 142 and is supported on a hollow metal tube 174. This support tube 174 extends back through the disc 140 out a substantial distance as shown in FIG. 19. The support mandrel 174 has an axial bore 176 which communicates with several radial ports 178.

Air under pressure to inflate the rubber mandrel 172 is supplied through a port 180 at the back end of an annular chamber 182. The air then passes through a rear port 178 in the support tube 174 into the axial bore 176. The air is then applied through the forward ports 178 to the inner surface of the inflatable mandrel 172 to cause the mandrel 172 to inflate from the state shown in FIGS. 15, 16 and 19 to the state shown in FIG. 17.

After the intermediate product 112 has been inserted into the forming cavity 142, air under pressure (40 lbs. per square inch gauge in one embodiment) is applied to force the inflatable mandrel 172 against the inner wall of the convolute intermediate product 112. As a consequence, the intermediate product 112 is unwound against the inner wall of the forming cavity 142 and held there under pressure. In this fashion, a precisely dimensioned product is provided. In order to provide this sizing function and assure proper transfer of the preformed intermediate product from the preform cavity 138 into the forming cavity 142, the diameter of the preform cavity 138 is slightly smaller (0.030 inches smaller in one embodiment) than is the diameter of the forming cavity 142. Thus, if the desired end product is to have a diameter of 1.000 inches, the preform cavity will have a diameter of 0.970 inches and the forming cavity 142 will have a diameter of 1.000 inches. The piston 166 that fits within the preformed cavity 138 will then have a diameter of approximately 0.965 inches so that it will have a slip-fit relationship with the preform cavity 138 yet be large enough to engage the edge of the intermediate product 112.

Not only does this expandable rubber mandrel 172 aid in sizing the end product by assuring that the web material is flush against the wall of the forming cavity 142 but it performs two other important functions. First, the mandrel 172 applies pressure to the plies of the convolutely wound material to assure that they fuse together when heat is applied. Furthermore, the mandrel assures a good thermal contact between the wall 142b of the forming cavity 142 so that the heat applied through the wall 142b of the cavity is efficiently employed and is conducted throughout the length and circumference of the collapsible cylinder being formed.

The inflatable rubber mandrel 172 is fastened at its rear end to the support tube 174 by turns of cord 182 wrapped around the inflatable mandrel 172 at a position over an annular recess 184 in the support tube 174. As may best be seen in FIGS. 14 and 15, the front end of the inflatable mandrel 172 is fastened to the support tube 174 by a washer 185 and screw 186 arrangement which holds a thickened front portion of the rubber mandrel 172 against a forward end of the support tube 174. The forward end of the support tube 174 is slightly re-entrant so that a thickened nose portion of the mandrel 172 can be forced by the washer 185 back into the re-entrant zone to fasten and seal the mandrel 172 to the tube 174.

The expandable balloon mandrel 172 in this embodiment is made of silicone rubber, but other embodiments may use other materials. The expansion of the cylindrical balloon mandrel 172 first takes place at the longitudinal center of the balloon mandrel 172 because its wall is thinner at its longitudinal center than at its ends. Then, the expansion within the balloon mandrel 172 spreads toward each end thereof. In one embodiment, a balloon mandrel was used which has a wall thickness of approximately 0.030 inches (30 mils) at its longitudinal center and which gradually increases in thickness toward its ends until it reaches a wall thickness of approximately 0.060 inches (60 mils). This expansion longitudinally from the center toward each end of the balloon mandrel 172 is important because it causes air bubbles between the layers of the preformed web to be squeezed out from the longitudinal center of the web toward each end of the web.

The forming cylinder 142b in one embodiment was a thin wall brass tube having a 0.030 inch (30 mil) wall thickness. Other materials could be employed. It is important that the forming cylinder 142b be a good heat conductor and be thin walled so that the fusion and cooling stages can be accomplished as quickly as possible. This forming cylinder 142b is pressed onto a mount 188 that in turn is held by bolts to a flange 170 of a rearwardly projecting tubular body 190; all of which is bolted to the disc 140. However, the support tube 174 and mandrel 172 are mounted for longitudinal movement within the forming cylinder 142b and rearwardly extending body 190. The reason for incorporating this ability to move longitudinally will be explained in connection with the removal operation. During the stage of removing the formed collapsible cylinder 100 from the forming cavity 142, the support tube 174 together with the collapsed rubber mandrel 172 are pushed rearwardly so that a removal mandrel can be inserted into the cavity 142.

The Rotatable Disc

Figure 21:
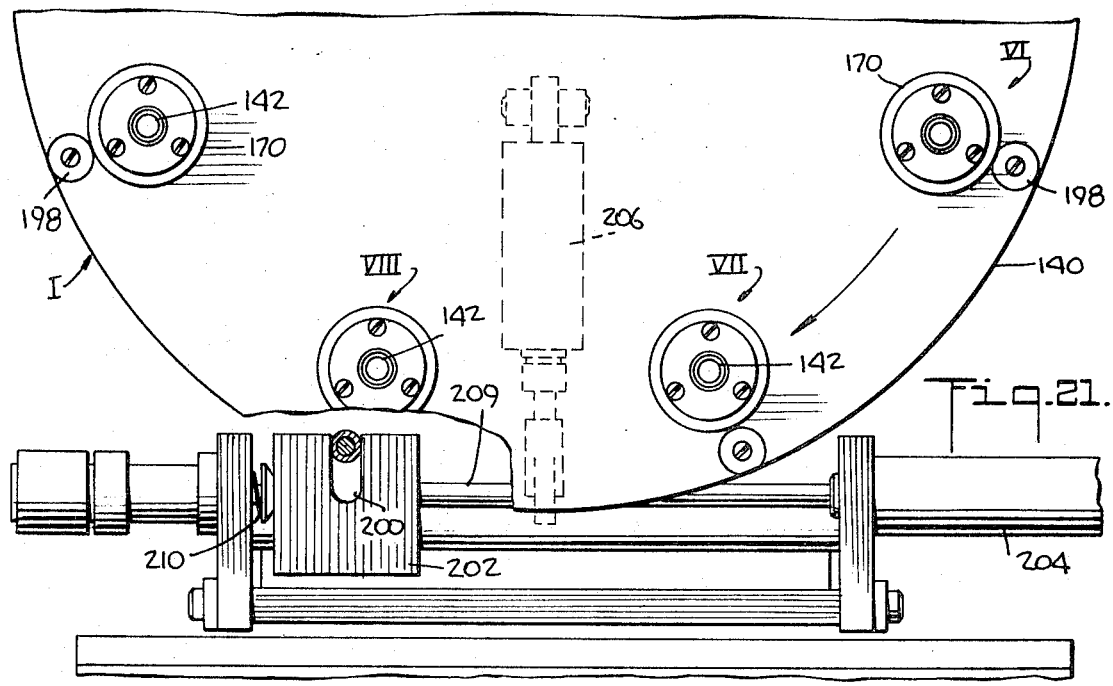
Figure 22:
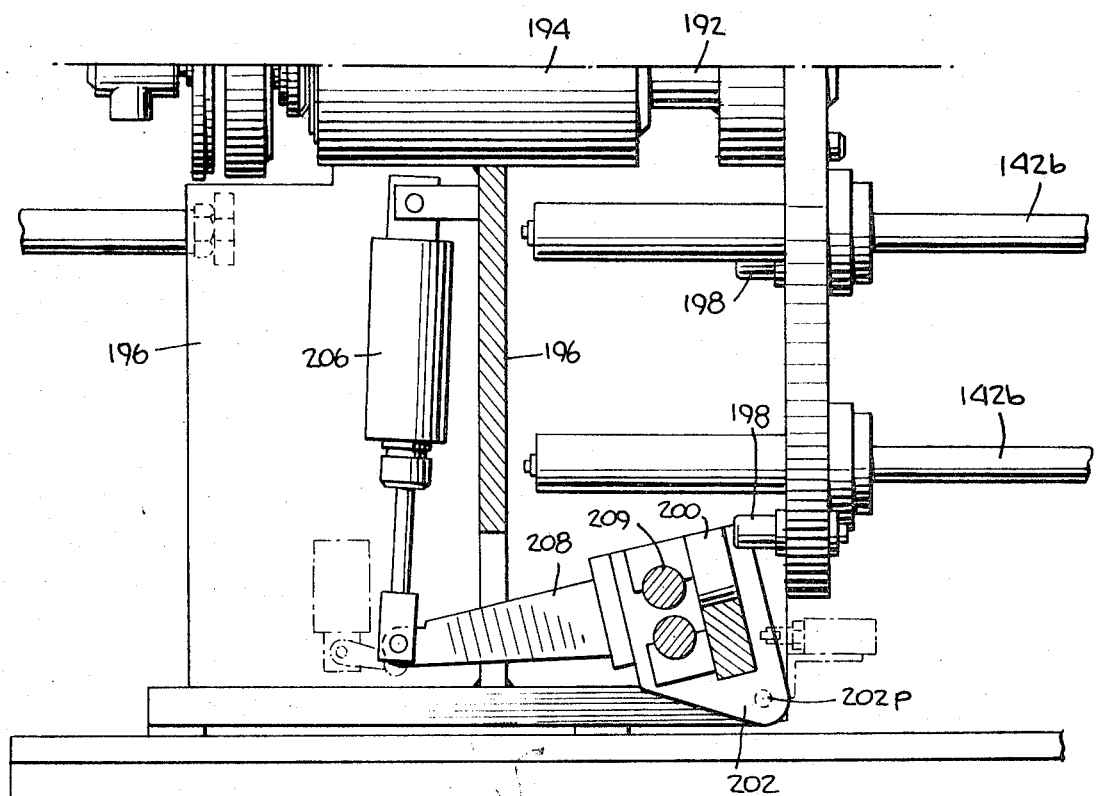

The design and operation of the rotatable disc 140 can best be understood with reference to FIGS. 8, 18, 20, 21 and 22. The disc 140 is supported on a shaft 192 that is journaled in a support 194. The support 194 in turn is held above the base by upstanding members 196. Radially outward from the flange 170 that is associated with each forming cavity 142 there is a pin 198 extending back from the disc 140. This pin 198 engages a slot 200 in a block 202 mounted on a pneumatic cylinder 204 (see FIG. 21). The block 202 is mounted for pivotal movement about a point 202p so that the slot 200 can engage and disengage a pin 198. As shown in FIG. 22, another pneumatic cylinder 206 is linked to an arm 208 extending rearwardly from the rails 209 on which the block 202 travels. When this cylinder 206 has been actuated into its extended position, as shown in FIG. 22, the block 202 is pivoted back so that the slot 200 cannot engage one of the pins 198.

As may be seen in FIGS. 20 and 21, the block 202 is spring loaded by spring 210 to be normally adjacent to station VII. When at station VII and when the cylinder 206 is in its retracted state, the block 202 will engage one of the pins 198. To index the disc 140, the pneumatic cylinder 204 is actuated to push the block 202 from the station VII position shown in FIG. 18 to the station VIII position shown in FIG. 21. After the indexing has been completed, the cylinder 206 is actuated to its extended position so that the block 202 disengages and the spring 210 returns block 202 to its normal station VII position as seen in FIGS. 18 and 20.

FIG. 8 is a plan view of the disc 140 in which the forming cylinders 142b at stations II and V have been cut away so that certain of the arrangements connected with the loading station I and removal station VI can be seen. Stations III and IV are both cooling stations and have exactly the same equipment associated therewith and thus this mechanism is illustrated only in connection with station IV. The aspects of the mechanisms associated with these stations VI, IV and I as shown in FIG. 8 can best be understood in connection with the description of these mechanisms as described elsewhere herein.

Fusion and Cooling

The apparatus at the fusion and cooling stations II, III, IV and V can best be understood with reference to FIGS. 23 through 26. FIG. 23 illustrates the condition of the forming cylinder 142b as being indexed from the loading station I to the fusion station II. The heating jacket 212 is composed of two halves. The two halves of the heating jacket 212 are held apart from and parallel to one another by a known type of linkage mechanism 214. The linkage mechanism 214 is actuated by a pneumatic cylinder 216. After the forming cylinder 142b has been rotated to the position shown in FIG. 23 between the two halves of the heating jacket 212, the cylinder 216 is actuated to the retracted position shown in FIG. 24 so that the heating jacket 212 clamps down around the forming cylinder 142b. As may be seen in FIGS. 24 and 25, two halves of the heating jacket 212 when clamped on the forming cylinder 142b are slightly spaced from one another so that complete and thorough contact is made between the outer surface of the forming cylinder 142b and the inner surface of the heating jacket 212. As shown in FIG. 26, the balloon mandrel 172 has been expanded at this point so that pressure is applied to the convolutely wound web material. Thus, heat and pressure are simultaneously applied to cause the convolutely wound web material to fuse and form product 100 shown in FIGS. 1, 3 and 4. After fusion and prior to the next indexing, the cylinder 216 is extended so that the two halves of the heating jacket 212 are separated and the forming cylinder 142b is free to rotate to station III which is a cooling station. There are three separate cooling stations, stations III, IV and V, each of which have apparatus similar to that shown in FIGS. 23 through 26 and thus no further illustration of that apparatus is provided here. When the jacket 212 is provided as a heating jacket, electrical heating elements may be deployed within the longitudinal openings 212a in the jacket 212. When the jacket 212 operates as a cooling jacket, then cold water can be passed through these openings 212a.

In the embodiment shown, there are three cooling stages and one fusion stage. During fusion, temperatures between the range of 350° F and 480° F have been employed. During cooling, water having a temperature between 40° F and 55° F has been used. It is convenient to pipe cold water at, for example, 40° F, through the openings 212a of the third stage of cooling and then have this water successively passed through the openings 212a of the second and first stages of cooling. The time it takes to adequately cool the polyethylene plies dictates that three stages of cooling and one stage of fusion will provide a rapid, economical production of the end product 100.

Removal Apparatus

The mechanism 220 for removing the formed collapsible cylinder 100 from the forming cavity 142 is shown in FIGS. 27 through 35. The removal mechanism is positioned at station VI and is in front of the disc 140. This removal mechanism contains an inflatable balloon pick-up tube 222 which is supported on a support tube 224 and which operates in a fashion similar to that of the forming mandrel 172. Radial ports 226 in the support tube 224 allow air under pressure to inflate the pick-up tube 222. When a forming cavity is rotated to station VI, it is in alignment with the retracted pick-up tube 222.

The support tube 224 for the inflatable pick-up tube 222 supports a rearwardly facing tip 228. This rearward facing tip 228 has a rearward surface designed to engage and fit on the head of the screw 186. When a forming cavity 142 is rotated to the removal station VI, the forming mandrel 172 has been deflated. Deflation of the forming mandrel 172 takes place after cooling at the third cooling station, station V. So that the collapsible cylinder product 100 can be permitted to shrink away from the wall of the cavity 142 during cooling and thus break any bond that might exist between the product 100 and the cavity wall, there is a momentary deflation between the second and third cooling stations (stations IV and V). But the mandrel 172 is immediately reinflated to make sure that the warm plastic plies do not flow and retain a smooth outer surface finish. But it is only after the final stage of cooling that the mandrel 172 is finally deflated.

To remove the formed collapsible cylinder product 100, the pick-up tube 222 is moved back into the forming cavity 142 by pneumatic power means (not shown). The tip 228 engages the screw head 186 serving to push back the deflated forming mandrel 172 and support tube 174. The engagement between the screw head 186 and tip 228 also serve to assure the centering of the pick-up tube 222 in the cavity 142. FIG. 28 shows the pick-up tube 222 fully inserted into the cavity 142 while the forming mandrel 172 is at its fully retracted position. At the point shown in FIGS. 28 and 29, air under a pressure of approximately twenty pounds per square inch gauge is admitted through the ports 226 to inflate the tubular pick-up tube 222 and thereby creating the condition shown in FIG. 30. The pick-up tube 222 thus frictionally engages the inner surface of the product 100. At this point, the support tube 224 and pick-up tube 222 are retracted, as shown in FIG. 31, carrying the product 100.

As soon as the product 100 has been carried out of the forming cavity 142 the pick-up tube 222 is deflated and the product 100 hangs on the pick-up mechanism 222, 224 in the fashion shown in FIG. 33. The pick-up tube 222 passes forward through an opening 230 in a stripper plate 232. The width of this opening 230 is substantially less than the outside diameter of the product 100 but is substantially greater than the diameter of the collapsed pick-up tube 222. Accordingly, as shown in FIG. 34, the product 100 is stripped off the pick-up tube 222 by the stripper 232 and the product 100 falls down into a chute 234 to be carried off for use in the formation of a collapsible squeeze tube or other product.

As may best be seen in FIG. 35, the mandrel support tube 174 travels out the rear of the cylindrical body 190 as the balloon mandrel 172 is pushed back by the pick-up tube 222. When the pick-up tube 222 retracts, carrying the product 100, a pneumatically actuated cylinder pushes a rod 236 forward to engage the rear end support tube 174 and push the rubber mandrel 172 and its support tube 174 forward. The return rod 236 pushes the mandrel 172 forward until the bushing 238, which is attached to the support tube 174, abuts against a shoulder 188s on the mount 188.

To assure that the product 100 does not stick to the wall of the forming cavity 142, it is preferable that the wall be coated with one of the known chemicals to reduce or prevent sticking.

What is claimed is:

1. A flexible cylinder adapted to be employed as the body of a squeeze tube having seamless surfaces and a multi-ply wall free of gas pockets comprising:

A metal foil covered on both surfaces by a plastic, the covered foil being convolutely wound approximately 720° and forming a wall structure such that each radial zone through the wall of the cylinder contains at least five plies, said five plies being in succession, an inner plastic ply, an inner metal foil ply, an intermediate plastic ply, an outer metal foil ply and an outer plastic ply, said intermediate ply being formed by fusing together the plastic on the outwardly facing surface of the inner metal foil ply that is in contact with the plastic on the inwardly facing surface of the outer metal foil ply, the structure of said metal foil being solely convolute from inner longitudinal edge to outer longitudinal edge, said metal foil being wound no less than 720° and including an overlap portion extending beyond said 720°, said plastic plies constituting a single integral structure, the entire inwardly facing surface area and the entire outwardly facing surface area of said metal foil convolute structure being in intimate contact with an adjacent plastic ply, each of said longitudinal edges of said metal foil convolute being entirely covered by and in intimate con-tact with said plastic, the portion of said outer plastic ply adjacent said outer longitudinal edge of said metal foil convolute being an integral structure, forming a smooth, seamless and con-tinuous surface, the portion of said inner plastic ply adjacent said inner longitudinal edge of said metal foil convolute being an integral structure and forming a smooth, seamless and continuous surface.

2. The flexible cylinder of claim 1, wherein:

said metal foil is an aluminum foil having a thickness within the range of 0.35 to 0.5 mils.

3. The flexible cylinder of claim 2 wherein:
said plastic is polyethelene, the thickness of said polyethelene being approximately twelve mils along any radius.

* * * * *